United States Patent Office 3,539,510
Patented Nov. 10, 1970

3,539,510
FLOCCULATION WITH MODIFIED ANIONIC POLYMERS

Charles P. Priesing, Ada, Okla., and Stanley J. Mogelnicki, Gerald J. Schwark, and Stacy L. Daniels, Midland, Mich., assignors to The Dow Chemical Company, Midland, Mich., a corporation of Delaware No Drawing. Filed June 12, 1967, Ser. No. 645,529
Int. Cl. B01d *21/01*
U.S. Cl. 210—52 10 Claims

ABSTRACT OF THE DISCLOSURE

Flocculant grade anionic polyelectrolytes, especially high molecular weight synthetic polymers having a plurality of carboxylate and/or sulfonate groups along the polymer chain, are modified to improve their flocculation properties by mixing them with a cationic amino polymer in aqueous solution at a total polymer solids concentration in excess of about 0.1 percent by weight. The useful amino polymer is characterized as being substantially free of quaternary ammonium groups and having a plurality of secondary and/or tertiary amine groups. The improved activity is found in mixtures wherein the ratio of anionic flocculant to amino polymer is greater than 3:1 and less than about 50:1, preferably from about 5:1 to 15:1. Anionic flocculants so modified yield a faster rate of flocculation, larger flocs and improved clarity in the overhead as compared to the unmodified anionic polymer.

The present invention concerns novel, modified anionic flocculants and a method for coagulating disperse solids in aqueous systems.

It is known that processes for the flocculation of disperse solids in aqueous systems are promoted by the use of polyelectrolytes having charges opposite to, and therefore attracted to, charged sites on disperse solids. It is generally believed that the flocculation or coagulation of the disperse solids is aided in at least two ways. The charges on the disperse particles are neutralized by the flocculant thus permitting coagulation as a result of VanderWaal's forces. In addition, polyelectrolyte molecules of sufficiently high molecular weight are believed to bridge different particles and thereby enhance large floc formation.

Although theoretical mechanisms as discussed above are helpful guides for some purposes, the practice of flocculation involves a number of parameters not yet fully understood and in some instances perhaps not yet recognized. As a consequence, developments in the art are often highly empirical and, in effect, based on practical performance criteria. In any flocculation operation, two of the most important performance criteria are the rate of flocculation and the ultimate clarity of the liquid after solids separation. The rate of flocculation is crucial to how fast the suspension can be processed, or in other terms, how large the equipment must be for a given flow rate. Clarity, of course, is an ultimate measure of success. In both of these respects, particularly with regard to flocculation and clarification of aqueous wastes, there is substantial room for improvement. Accordingly, principal objects of the instant invention include providing a flocculant composition and process directed to such ends.

It is known that water-soluble polymers of opposite charges will interact ionically in water solution to form a precipitate, or sometimes a gel or pultaceous coascervate. See for example the teachings of Fuoss and Sadeck, Science, 110, 552 (1949) and Michaels Industrial and Engineering Chemistry, 57, 32 (1965). There has also been a suggestion that dual systems of cationic and anionic flocculants give improved flocculation. See Wadsworth and Cutler, Mining Engineering, Transactions A.I.M.E. 205, page 830 (1956).

In the instant invention, it has been discovered that flocculant grade, i.e., high molecular weight, anionic polymer flocculants can be modified by certain cationic, water-soluble, amino polymers to produce surprisingly improved flocculation results. Essential to the preparation of such modified anionic polymers is the use of amino polymers characterized as being substantially free of quaternary ammonium groups and having a plurality of functional nitrogen groups in the form of secondary and tertiary amine groups. The amine polymers are further characterized as being water-soluble, having a molecular weight above about 1000.

A fluid solution of the modified anionic polymer is prepared by the addition of an aqueous solution of an amino polymer to an aqueous dispersion or solution of the anionic polymer, or by the additon of a powdered water-dispersed, or water-solubilized anionic polymer to an aqueous solution of the amino polymer. To avoid the formation of lumps, care must be taken to maintain a high ratio of anionic polymer flocculant to cationic amino polymer in the mixing zone. Preferably, rapid mixing is employed during, and for a short time following, the addition of one polymer to the other.

Best results have been obtained when the modified anionic polymer is prepared in solutions with a total polymer solids concentration above about 0.1 weight percent, preferably above about 0.5 weight percent. Normally the polymer solids will not exceed about 5 weight percent. The ratio of anionic to cationic polymer should be greater than 3:1 but less than about 50:1. Optimally, the anionic flocculant is used in amount sufficient to provide a ratio from about 5:1 to 15:1 of anionic flocculant to cationic amino polymer, on a weight basis.

If desired, sufficient additional water may be added to the concentrate of mixed polymers to prepare more dilute applicating solutions. Good results are obtained with the modified anionic polymers when they are used, that is applied, in the form of aqueous solutions containing from about 0.05 to about 2 percent by weight dissolved polymer solids.

It is to be noted that since a high molecular weight polymer is involved and conservation of the molecular weight of the anionic polymer flocculant is desirable to preservation of flocculation activity, that the type and extent of agitation in preparing the modified polymer should be only such as to achieve uniform and rapid mixing, without subjecting the polymer to excessive shearing conditions. For instance, paddle agitators operating at about 100 r.p.m. for periods from 15 minutes to several hours or more can be used for this purpose. On occasion it may be necessary to employ more vigorous agitation in order to avoid the formation of lumps. Any means of agitation such as shaking, cascading, spraying and hydraulic jets can be substituted for the paddle or turbine mixers in preparing the desired polymer solutions.

Having prepared the modified anionic flocculant it is applied to the suspension to be clarified under flocculating conditions, i.e. the polymer is applied in the form of the above indicated dilute solution under conditions of agitation which achieve dispersion of the polymer throughout the system. Once dispersion is achieved, flocculation may be further aided with mild agitation. Ultimately, the treated suspension is allowed to settle or subjected to other liquid-solids separatory techniques such as centrifugation, filtration and flotation.

Aqueous dispersions to which the invention is applicable may be suspensions of either or both inorganic and organic solids susceptible to flocculation with anionic polymers. For instance, coagulation and settling, or if desired coagulation, flotation or filtration can be achieved according to the improved practice of the invention in a wide variety of aqueous suspensions of solids such as aqueous dispersions of clays, metal oxide precipitates, coal washery discharges, drilling muds, raw water supplies for domestic and industrial use, and in general any of the wide number of naturally occurring silted water sources and industrial or municipal wastes. The modified anionic polymers of the instant invention are especially effective in suspensions of organic solids such as municipal and industrial sewages, as well as various process streams comprising suspended organic solids. The amount of the modified anionic polymer used will vary depending upon the system to be treated but generally good results can be achieved utilizing from about 0.05 up to about 2 parts per million of the modified anionic polymer based on the weight of the system treated. Larger amounts may be used in special cases, but in any event the polymer will seldom be employed in an amount greater than about 20 parts per million by weight based on the weight of the aqueous system treated. Excellent results have been achieved in municipal sewage clarification utilizing from about 0.1 up to 1 par per million by weight of the modified anionic polymer.

The useful anionic polymer flocculants include any of the synthetic, high molecular weight, water-soluble polymers which evidence the capability to coagulate disperse solids in aqueous systems. Many such polymers are known. Of particular interest are those obtained as polymerization products of monoethylenically unsaturated monomers with a plurality of carboxylate and/or sulfonate groups along the polymer chain. The polymers are "high molecular weight" for purposes herein if an aqueous solution of the polymer has a viscosity of at least about 5 centipoises, measured as a 0.5 percent by weight solution of the polymer in 4 percent by weight sodium chloride in water with an Ostwald viscosimeter at 25° C.

Examples of high molecular weight anionic polymer flocculants that may be used in the practice of the invention include the homopolymers and copolymers of alkali metal styrene sulfonates, acrylates, and methacrylates. Suitable comonomers may be any water-soluble or water-insoluble monoethylenically unsaturated monomer copolymerizable with one of the foregoing to produce water-soluble polymers. When water-insoluble monomers are employed, they are used in amounts insufficient to impair the water-solubility of the resulting copolymer. Common comonomers include acrylamide, methacrylamide, acrylonitrile, methacrylonitrile, styrene, vinyl acetate, vinyl toluene, methylacrylate, oxazolidinone, pyrrolidinone, and the like. Other anionic polymers include the alkali metal and ammonium salts of high copolymers of styrene and substituted styrenes with maleic acid. Less frequently suggested for this use but nevertheless effective are the homopolymers and copolymers of the sulfoalkyl acrylates and carboxayalkyl acrylates such as sodium sulfoethyl acrylate and sodium carboxyethyl acrylate. Still other water-soluble synthetic polymers taught to be useful as anionic flocculants include the carboxyalkyl cellulose ethers such as carboxymethyl cellulose, carboxymethyl methyl cellulose, carboxymethyl hydroxyethyl cellulose and similar derivatives of other polysaccharides such as starch.

The water-soluble amino polymer employed in the invention may be any water-soluble polymer containing amino and imino groups with secondary and/or tertiary nitrogen. Included are polymers obtained by polymerization of monoethylenically unsaturated monomers, condensation reaction products of polyamines and various co-reactants such as formaldehyde, dihaloalkanes, epichlorohydrin and alkylene oxides and derivaties of natural polymers such as the aminoalkyl derivatives of polysaccharides. The molecular weight should be at least about 1000. It is essential that there be some functional nitrogen in the form of secondary or tertiary nitrogen and that the polymer be essentially free of quaternary ammonium groups, e.g., quaternary ammonium groups should constitute less than about 15 mole percent of the nitrogen functional groups present.

Specific examples of suitable polymers include the homopolymers and water-soluble copolymers of N-vinylpyridine, aminoalkyl acrylates, methacrylates and maleates, aminoalkyl acrylamides and methacrylamides. Such monomers may be homopolymerized or copolymerized with compatible monoethylenically unsaturated comonomers such as acrylamide, methacrylamide, acrylonitrile, N-vinyl oxazolidinone, N-vinyl pyrrolidinone, vinyl acetate, vinyl methyl ether, vinyl formate, styrene, propylene, isobutylene, vinyl chloride. Condensation polymers characterized in that the polymer chain comprises a plurality of introlinear imino groups include for example the polyalkylene polyamines and polyethyleneimines. The polyalkylene polyamines are exemplified by the condensation products of dihaloalkanes and ammonia, epichlorohydrin and ammonia, lower polyamines and dihaloalkanes, and polyamines and formaldehyde. Polyethylenimines are obtained by the polymerization of monomers through an imino group. Examples are polyethylenimine, poly - 1,2 - propylenimine and poly-1,2-butylenimine. Preparative techniques for these polymers and many derivatives thereof such as epichlorohydrin and ethylene oxide reaction products thereof are known to the art.

The following examples further illustrate the present invention.

EXAMPLES 1–30

An aqueous dispersion containing 30 parts per million by weight suspended organic and inorganic solids, constituted in a manner to simulate a municipal sewage, was fluocculated and clarified according to the instant invention. In particular, high molecular weight, anionic polymer flocculants and several different water-soluble amino polymers were employed to prepare the modified anionic flocculating reagents of the invention.

Examples 1–9 illustrate the general usefulness of a number of differing amino polymers for modifying anionic polymer flocculants. Examples 10–19 show the comparative effectiveness of the anionic polymer flocculants and amino polymers when each is employed alone to flocculate the same suspension. Examples 20–23 illustrate the essentiality of preparing the modified anionic at a high total polymer solids concentration. In particular, they show the importance of preparing the mixture at a concentration greater than about 0.1 percent by weight polymer solids. The ratio of the anionic polymer flocculant to amino polymer is also of importance as is shown by Examples 24–26. The molecular weight of the amino polymer is a further parameter of the instant invention as shown in Examples 27–30. As therein illustrated, the molecular weight of the amino polymer should be above about 1000 for effective results.

The experimental procedure for obtaining the data in the following table involved photometric measurements of the flocculation sequence. For this purpose, modified anionic polymers were prepared by making up a water solution of the cationic amino polymer and then incorporating, with stirring, sufficient anionic polymer as a dry powder to give the desired polymer ratio. In most operations, this concentrate solution contained 1.1 weight percent total mixed polymer solids. For the purposes of application to the suspension to be flocculated, the modified anionic polymer concentrate was diluted to 0.05 percent by weight total polymer solids with additional deionized water.

The flocculation procedure involved agitating the suspension for 15 minutes after which polymer was applied. Agitation was continued thereafter for an additional 15 minutes to disperse polymer throughout the suspension and achieve flocculation of the suspended solids. Throughout the procedure, from the first addition of polymer, the amount of light transmitted through the suspension was measured photometrically.

The particular photometer used monitored white light from a tungsten bulb transmitted through 15 centimeters of the suspension. The variations in transmittance (T) throughout the flocculation sequence were recorded as a function of time ($t$) in minutes. All agitation of the aqueous dispersion was accomplished by means of a 4-blade paddle stirrer rotated at 55 r.p.m.

The data obtained for each run was used to determine the initial rate of flocculation ($r_F$) upon addition of the polymer ($t=0$) and the degree of flocculation ($e_F$) after 15 minutes of flocculation ($t=15$ min.). The values of $e_F$ were obtained by first calculating the absorbence (A) of the suspension according to the following formula $$A=-\log_{10}T$$

wherein T is the photometrically ascertained value of the transmittance. For the purposes hereof A was assumed to be directly proportional to the concentration of the suspended particles, i.e. $A=Kc$ wherein $c$ is the concentration of the particles. The dimensionless quantity $e_F$ is defined according to the formula $$e_F=(1-A/A_0)_{t=15\text{ min.}}$$

wherein $A_0$ is the initial absorbence value and A is the absorbence measured during the flocculation procedure. $e_F$ is thus a measure of the compaction or disappearance of suspended material from the light path. It is used herein as a quantitative index of the degree of flocculation ($e_F$) when A is the absorbence after the first 15 minutes of agitated contact with the polymer. The overall range of values for $e_F$ is from 0 to 1, with 0 showing no improvement and 1 indicating a 100 percent disappearance of light absorbing material. The initial rate of flocculation $r_F$ is defined as the initial slope of the transmittance versus time curve:

$$r_F=(dT/dt)_{t=0}$$

and is expressed in units of reciprocal minutes.

Unless otherwise specified in the following Table I under the column heading "Special Conditions" the ratio of anionic polymer flocculant to amino polymer was 10:1 and the modified anionic polymer was prepared at a total polymer solids concentration of 1.1 weight percent.

TABLE I

| Example No. | Anionic polymer flocculant | Amino polymer | Special conditions | Nitrogen functionality [1] | $e_F$ (Dimensionless) polymer dose [2] | | | $r_F$ (Reciprocal minutes) polymer dose [2] | | |
|---|---|---|---|---|---|---|---|---|---|---|
| | | | | | .1 | .3 | 1 | .1 | .3 | 1 |
| 1 | SPSS [3] | 2-MAEM [5] | | 3 | [13] .472+ | .543 | .878+ | .100+ | .185 | .455+ |
| 2 | SPSS | 2-MAMAm [6] | | 3 | .499 | .734 | | .074 | .073 | |
| 3 | SPSS | 2-MAEAm [7] | | 3 | | .704 | | | .061 | |
| 4 | SPSS | PAPA [8] | | 1, 2, 3 | .554 | .733 | .449 | .089 | .072 | .055 |
| 5 | SPSS | PEI [9] | | 1, 2, 3 | .438 | .768 | .848+ | 0.98 | .172 | .500+ |
| 6 | SPSS | PAEM [10] | | 2 | .535 | .638 | .489 | .077 | .065 | .038 |
| 7 | SPSS | HEPEI [11] | | 3 | | .771 | | | .061 | |
| 8 | SPSS | AEM [12] | | 1 | .127 | .244 | .174 | .005 | .017 | .017 |
| 9 | HPAAm [4] | PEI | | 1, 2, 3 | .624 | .669 | .600 | .062 | .049 | .058 |
| Comparative examples with individual polymers | | | | | | | | | | |
| 10 | | PAPA | | 1, 2, 3 | | .176 | | | .032 | |
| 11 | | PEI | | 1, 2, 3 | | .275 | | | .037 | |
| 12 | | 2-MAEM | | 3 | .214 | .295 | .355 | .025 | .039 | .056 |
| 13 | | HEPEI | | 3 | | .201 | | | .032 | |
| 14 | | 2-MAMAm | | 3 | | .260 | | | .022 | |
| 15 | | 2-MAEAm | | 2 | | .281 | | | .035 | |
| 16 | | PAEM | | 2 | | .113 | | | .005 | |
| 17 | | AEM | | 1 | | .256 | | | .041 | |
| 18 | SPSS | | | | .443 | .538 | .550 | .059 | .066 | .056 |
| 19 | HPAAm | | | | .471 | .510 | .507 | .045 | .027 | .021 |
| Comparative examples with special conditions | | | | | | | | | | |
| | | | Polymer concentration, percent | | | | | | | |
| 20 | SPSS | PAPA | 1.1 | 1, 2, 3 | .554 | .733 | .449 | .089 | .072 | .055 |
| 21 | SPSS | PAPA | 0.33 | 1, 2, 3 | .560 | .704 | .719+ | .095 | .112 | .172+ |
| 22 | SPSS | PAPA | 0.11 | 1, 2, 3 | .495 | .742 | .749+ | .083 | .089 | .081+ |
| 23 | SPSS | PAPA | 0.033 | 1, 2, 3 | .151 | .226 | .304 | .008 | .019 | .034 |
| | | | Weight ratio, anion/cation | | | | | | | |
| 24 | SPSS | PAPA | 3:1 | 1, 2, 3 | .058 | .110 | .222 | [14] (−) | (−) | (−) |
| 25 | SPSS | PAPA | 10:1 | 1, 2, 3 | .554 | .733 | .449 | .089 | .072 | .055 |
| 26 | SPSS | PAPA | 30:1 | 1, 2, 3 | .461 | .560 | .619 | .069 | .074 | .061 |
| | | | Catonic polymer, mol. wt. | | | | | | | |
| 27 | SPSS | PEI | 100,000 | 1, 2, 3 | .438 | .768 | .848+ | .098 | .172 | .500 |
| 28 | SPSS | PEI | 60,000 | 1, 2, 3 | .389 | .774 | .870+ | .088 | .172 | .476+ |
| 29 | SPSS | PEI | 1,800 | 1, 2, 3 | .360 | .587 | .830+ | .083 | .094 | .112 |
| 30 | SPSS | PEI | 300 | 1, 2, 3 | .392 | .518 | .569 | .069 | .083 | .071 |

1 The number under "Nitrogen functionality" refers to the form of the amine groups in the amino polymer, i.e., 1=primary amine, 2=secondary amine and 3=tertiary amine.

2 Polymer dose as applied to modified anionic polymers refers only to the amount of anionic polymer used.

3 SPSS is sodium polystyrene sulfonate having a molecular weight of at least about 6,000,000.

4 HPAAm is a partially hydrolyzed acrylamide having about 25 mole percent of its carboxamide groups hydrolyzed to sodium carboxylate groups and a molecular weight of at least about 2,000,0000.

5 2-MAEM is a homopolymer of dimethylaminoethyl-N-methacrylate believed to have a molecular weight of approximately 1,000,000.

6 2-MAMAm is a copolymer of acrylamide and dimethylaminomethyl-N-acrylamide having a molecular weight of about 1,000,000.

7 2-MAEAM is a copolymer of acrylamide and dimethylaminoethyl-N-acrylamide having a molecular weight of about 1,000,000.

8 PAPA is a polyalkylenepolyamine obtained as a condensation reaction product of polyalkylenepolyamines and dichloroethane having a molecular weight of about 30,000.

9 PEI is a polyethylenimine having a molecular weight of about 100,000, unless otherwise specified under the column headed "Special conditions."

10 PAEM is a homopolymer of phenylaminoethylmethacrylate believed to have a molecular weight of about 100,000.

11 HEPEI is a water-soluble hydroxyethylated polyethylenimine.

12 AEM is a homopolymer of aminoethylmethacrylate believed to have a molecular weight of about 100,000.

13 A plus sign (+) is indicative of a possibly slightly high value due to sticking of flocculated particles to the walls of the containing vessel.

14 A negative sign (−) is indicative of a negative initial rate of flocculation (dispersion).

The values for $e_F$ in Table I clearly evidences a significant improvement in flocculation effectiveness for the modified anionic polymer flocculants. This is readily seen by comparing $e_F$ values for the modified polymer with those of the constituent polymers. The values of $r_F$ indicate the rate of flocculation and in many instances similar improvements are seen in this parameter of the flocculation process.

EXAMPLES 31–57

A natural sewage was subjected to flocculation with a series of anionic and cationic flocculants individually and also with modified anionic flocculants in accordance with the invention. For the purposes of comparison, runs were also carried out wherein the cationic and anionic polymers were added sequentially to the sewage.

The modified anionic polymers were prepared by sifting powdered anionic polymer flocculant into an aqueous solution of the cationic amino polymer. Rapid mixing with a laboratory stirrer was continued throughout, and for about 10 minutes following the addition of the anionic polymer. Following this rapid mixing, the modified anionic polymers were further agitated on a laboratory shaker for about 2 hours. The modified anionic polymers made with SPSS (cf. FN (3) Table I) were prepared at a total polymer concentration of 0.5 weight percent. Those made with HPAAm (cf. FN (4) Table I) were prepared at a total polymer concentration of 0.25%. In all cases, the modified anionic polymers were diluted with water to applicating solution concentration of 0.05 weight percent before addition to the suspension to be flocculated.

The experimental procedure involved placing a 1 liter aliquot of a natural sewage in a 1.5 liter beaker equipped with a Phipps and Bird laboratory stirrer.

The stirrer was turned on at about 100 r.p.m., and the suspension dosed with 0.4 part per million, based on total weight, with the desired polymer system. The rapid stirring was continued for about 1 minute after addition of the polymer. Following this, the stirring speed was reduced to about 35 r.p.m. for about 5 minutes to complete the flocculation. The flocculated suspension was then allowed to settle while stirring was continued at about 5 r.p.m.

for 5 minutes. After settling, an aliquot of the supernatant was removed at a depth of 2.5 centimeters below the surface of the liquid and the quantity of suspended solids in such aliquot determined gravimetrically.

The results of the foregoing are set forth in the following Table II.

TABLE II

| Example No. | Polymer composition | Polymer weight ratio, anionic/cationic | Suspended solids remaining in overhead (p.p.m.) |
|---|---|---|---|
| Raw sewage (sample 1) | None | | 145 |
| Settled control | None | | 92 |
| 31 | SPSS [1] | | 61 |
| 32 | PAPA [2] | | 74 |
| 33 | PEI [3] | | 81 |
| 34 | CA [4] | | 80 |
| 35 | SPSS modified with PAPA | 5/1 | 61 |
| 36 | SPSS modified with PAPA | 10/1 | 50 |
| 37 | SPSS modified with PAPA | 15/1 | 50 |
| 38 | Sequential addition SPSS and PAPA | 10/1 | 79 |
| 39 | SPSS modified with PEI | 5/1 | 90 |
| 40 | SPSS modified with PEI | 10/1 | 59 |
| 41 | SPSS modified with PEI | 15/1 | 56 |
| 42 | Sequential addition SPSS and PEI | 10/1 | 81 |
| 43 | SPSS modified with CA | 5/1 | 59 |
| 44 | SPSS modified with CA | 10/1 | 54 |
| 45 | SPSS modified with CA | 15/1 | 65 |
| 46 | Sequential addition SPSS and CA | 10/1 | 91 |
| Raw sewage (sample 2) | None | | 174 |
| Settled control | None | | 84 |
| 47 | HPAAm | | 56 |
| 48 | PAPA | | 84 |
| 49 | PEI | | 74 |
| 50 | HPAAm modified with PAPA | 5/1 | 34 |
| 51 | HPAAm modified with PAPA | 7/1 | 36 |
| 52 | HPAAm modified with PAPA | 12/1 | 38 |
| 53 | Sequential addition HPAAm and PAPA. | 5/1 | 72 |
| 54 | HPAAm modified with PEI | 5/1 | 36 |
| 55 | HPAAm modified with PEI | 7/1 | 40 |
| 56 | HPAAm modified with PEI | 12/1 | 42 |
| 57 | Sequential addition HPAAm and PEI. | 5/1 | 58 |

[1] SPSS is sodium polystyrene sulfonate having a molecular weight of at least about 6,000,000.

[2] PAPA is a polyalkylenepolyamine obtained as a condensation reaction product of polyalkylenepolyamines and dichloroethane having a molecular weight of about 30,000.

[3] PEI is a polyethylenimine having a molecular weight of about 100,000.

[4] CA is a commercial water-soluble cationic amino flocculant available under the trademark Primafloc C-7 (Rohm and Haas).

The foregoing data illustrates the superiority of the modified anionic flocculants of the instant invention in comparison to comparable doses of the individual flocculants and the use of such flocculants by sequential addition to the suspension.

What is claimed is:

1. A method for flocculating an aqueous dispersion of solids susceptible to flocculation with an anionic polymer flocculant which comprises forming a mixture in water solution of a high molecular weight, water-soluble, anionic polymer flocculant and a water-soluble, cationic amino polymer and applying said mixture to the dispersion, said anionic polymer being selected from the group consisting of carboxyalkyl cellulose ethers, alkali metal and ammonium salts of high copolymers of styrene with maleic acid, alkali metal and ammonium salts of high copolymers of substituted styrenes with maleic acid, homopolymers of alkali metal styrene sulfonates, alkali metal acrylates, alkali metal methacrylates, sulfoalkyl acrylates and carboxyalkyl acrylates and water-soluble copolymers of said sulfonates, acrylates and methacrylates with acrylamide, methacrylamide, acrylonitrile, styrene, vinyl acetate, vinyl toluene and methacrylonitrile, and said cationic amino polymer being characterized by a molecular weight of at least about 1000, as being substantially free of quaternary ammonium groups and having a plurality of the amino groups in the form of secondary and tertiary amines, said cationic polymer being selected from the group consisting of polyalkylene polyamines, polyethylenimes, hydroxyalkylated polyethylenimines, homopolymers of alkylaminoalkyl acrylates, alkylaminoalkyl methacrylates, alkylaminoalkyl N-acrylamides and alkylaminoalkyl N-methacrylamides and copolymers of such alkylaminoalkyl compounds with acrylamide and methacrylamide, said anionic and amino polymers being present in relative amounts sufficient to provide a ratio of anionic to cationic polymer within the range of 3:1 to 50:1, on a weight basis.

2. A method as in claim 1 wherein the solution of anionic polymer flocculant and amino polymer is prepared at a polymer solids concentration in excess of 0.1 percent by weight.

3. A method as in claim 2 wherein the polymer solution is prepared by dispersing the cationic amino polymer in water and then the anionic polymer flocculant is added as a dry powder with vigorous agitation.

4. A method as in claim 2 wherein the polymer solution is diluted with water for application to the aqueous dispersion of solids.

5. A method as in claim 2 wherein the ratio of anionic polymer flocculant to amino polymer is within the range of 5:1 to 15:1 on a weight basis.

6. A method as in claim 2 wherein the ratio of anionic polymer flocculant to amino polymer is within the range of 5:1 to 15:1, on a weight basis and the total polymer solids in solution is at least 1 percent, on a weight basis.

7. A method as in claim 1 wherein the high molecular weight anionic polymer is characterized by having along the polymer chain a plurality of at least one anionic functional group selected from the group consisting of alkali metal and ammonium carboxylate and sulfonate groups.

8. A method as in claim 1 wherein the anionic polymer flocculant is a high molecular weight alkali metal or ammonium polystyrene sulfonate and the amino polymer is a water-soluble polyamine having a plurality of intralinear amino groups.

9. A method as in claim 1 wherein the anionic polymer flocculant is a high molecular weight, partially hydrolyzed polyacrylamide and the amino polymer is a water-soluble, polyamine having a plurality of intralinear amino groups and a molecular weight above 1000.

10. A method as in claim 1 wherein the aqueous dispersion is a sewage.

References Cited

UNITED STATES PATENTS

| | | | |
|---|---|---|---|
| 3,408,293 | 10/1968 | Dajanl | 210—53 |
| 3,409,546 | 11/1968 | Mozelnicki | 210—52 |
| 3,445,441 | 5/1969 | Rushton | 210—54 X |

FOREIGN PATENTS

| | | |
|---|---|---|
| 637,703 | 3/1962 | Canada. |

OTHER REFERENCES

Technical Bulletin: "Separan," Dow Chemical Company, 1961.

MICHAEL ROGERS, Primary Examiner